United States Patent
Sugawara et al.

(10) Patent No.: US 10,351,140 B2
(45) Date of Patent: Jul. 16, 2019

(54) TRANSMISSION GEAR CONTROL APPARATUS FOR VEHICLE

(71) Applicant: TOYOTA JIDOSHA KABUSHIKI KAISHA, Toyota-shi, Aichi-ken (JP)

(72) Inventors: Akio Sugawara, Toyota (JP); Keigo Matsubara, Nagoya (JP); Akihito Hayasaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 15/459,491

(22) Filed: Mar. 15, 2017

(65) Prior Publication Data
US 2017/0274905 A1    Sep. 28, 2017

(30) Foreign Application Priority Data
Mar. 22, 2016 (JP) .................................. 2016-057047

(51) Int. Cl.
| | |
|---|---|
| *F16H 59/46* | (2006.01) |
| *F16H 61/16* | (2006.01) |
| *B60W 30/19* | (2012.01) |
| *B60W 10/02* | (2006.01) |

(Continued)

(52) U.S. Cl.
CPC .......... *B60W 30/19* (2013.01); *B60W 10/026* (2013.01); *B60W 10/11* (2013.01); *B60W 2050/0026* (2013.01); *B60W 2510/0233* (2013.01); *B60W 2510/0241* (2013.01); *B60W 2520/10* (2013.01); *B60W 2540/10* (2013.01);
(Continued)

(58) Field of Classification Search
CPC ..................... F16H 2059/467; F16H 2061/166
See application file for complete search history.

(56) References Cited

U.S. PATENT DOCUMENTS

| | | | | |
|---|---|---|---|---|
| 5,133,232 A | * | 7/1992 | Kikuchi ............... | B60W 10/06 192/3.29 |
| 2009/0192017 A1 | * | 7/2009 | Lee ....................... | F16H 61/143 477/169 |
| 2010/0049411 A1 | | 2/2010 | Matsunaga et al. | |

FOREIGN PATENT DOCUMENTS

| | | |
|---|---|---|
| JP | 2010-112492 A | 5/2010 |
| JP | 2012-107537 A | 6/2012 |
| JP | 2013-167276 A | 8/2013 |

OTHER PUBLICATIONS

Machine translation JP2012107537 filed Aug. 16, 2018 (Year: 2018).*

* cited by examiner

*Primary Examiner* — Tisha D Lewis
(74) *Attorney, Agent, or Firm* — Oliff PLC

(57) ABSTRACT

A transmission gear control apparatus for a vehicle is provided. The vehicle includes an automatic transmission, a torque converter, and an accelerator operation amount sensor. The torque converter is disposed between the engine and the automatic transmission. The transmission gear control apparatus includes an electronic control unit. The electronic control unit is configured to: (i) control switching of a transmission gear stage of the automatic transmission at least on a basis of a change in vehicle speed of the vehicle; (ii) control lockup of a lock-up clutch of the torque converter on a basis of a state of the vehicle; and (iii) control the automatic transmission when the accelerator operation amount is equal to or larger than a specified value such that an upshift of the automatic transmission is performed at a higher vehicle speed as a rotation difference between input and output of the torque converter is reduced.

5 Claims, 8 Drawing Sheets

(51) Int. Cl.
 *B60W 10/11* (2012.01)
 *B60W 50/00* (2006.01)
(52) U.S. Cl.
 CPC ................ *B60W 2710/024* (2013.01); *B60W 2710/1005* (2013.01)

FIG. 2

|     | C1 | C2 | C3 | C4 | B1 | B2 |
|-----|----|----|----|----|----|----|
| 1st | O  | —  | —  | —  | —  | O  |
| 2nd | O  | —  | —  | —  | O  | —  |
| 3rd | O  | —  | O  | —  | —  | —  |
| 4th | O  | —  | —  | O  | —  | —  |
| 5th | O  | O  | —  | —  | —  | —  |
| 6th | —  | O  | —  | O  | —  | —  |
| 7th | —  | O  | O  | —  | —  | —  |
| 8th | —  | O  | —  | —  | O  | —  |
| Rev | —  | —  | O  | —  | —  | O  |

TRANSMISSION GEAR CONTROL APPARATUS FOR VEHICLE

INCORPORATION BY REFERENCE

The disclosure of Japanese Patent Application No. 2016-057047 filed on Mar. 22, 2016 including the specification, drawings and abstract is incorporated herein by reference in its entirety.

BACKGROUND

1. Technical Field

The present disclosure relates to a transmission gear control apparatus that controls an automatic transmission on the basis of a vehicle state and, in particular, to gear change control in the case where a torque converter that has a lock-up clutch is provided.

2. Description of Related Art

Conventionally, in a stepped automatic transmission that is mounted on a vehicle, a favorable shift schedule that corresponds to a vehicle state including a vehicle speed, an accelerator operation amount, and the like, for example, is set in an aspect of a gear change chart, and an appropriate transmission gear stage for a current driving state is selected by referring to this gear change chart, that is, a gear change map. A favorable engagement state of a lock-up clutch in a torque converter is also set in such a way as to correspond to the vehicle state, and the lock-up clutch is thereby controlled in an appropriate engagement state for the current vehicle state.

For example, for a control apparatus described in Japanese Patent Application Publication No. 2012-107537 (JP 2012-107537 A), a lock-up region, a flex lock-up region, and a torque converter region are set in an aspect of a lock-up chart in advance for each of the transmission gear stages of the automatic transmission. In the lock-up region, the lock-up clutch is completely engaged. In the flex lock-up region, the lock-up clutch is controlled in a slipped state. In the torque converter region, the lock-up clutch is disengaged. Then, the lock-up clutch is controlled in the appropriate engagement state for the current vehicle state by referring to the lock-up chart, that is, a lock-up control map.

More specifically, the torque converter region and the flex lock-up region are shown in a lock-up control map that is exemplified in FIG. 5 of the same literature. In the torque converter region, an accelerator operation amount at a fourth gear stage is equal to or larger than a specified value. In the flex lock-up region, the accelerator operation amount is smaller than the specified value. That is, in the region where the accelerator operation amount is equal to or larger than the specified value, the lock-up clutch is disengaged, so as to suppress generation of booming noise and the like in a vehicle cabin. In addition, a flex lock-up on line, a flex lock-up off line, and the like are set between the two regions.

SUMMARY

By the way, it has been proposed in recent years to engage the lock-up clutch also in the region where the accelerator operation amount is equal to or larger than the specified value, so as to improve drivability of the vehicle. For example, as exemplified in FIG. 5, which will be described below, according to one embodiment of the present disclosure, there is a case where the flex lock-up region is set on a high speed side in a region where the accelerator operation amount has a maximum value (there is a case where the lock-up region is also set on an even higher speed side in the same region).

Just as described, it is considered that a driver of the vehicle desires to exert maximum engine performance when the accelerator operation amount is equal to or larger than the specified value. Thus, it is desired to delay an upshift of the transmission gear stage and to perform the upshift after an engine speed exceeds a maximum output speed. However, as described in JP 2012-107537 A, the region where the accelerator operation amount is equal to or larger than the specified value is conventionally set as the torque converter region in general, and, in consideration of slippage of the torque converter, an upshift line is set to prevent the engine speed from exceeding an allowable upper limit.

Accordingly, in the case where the lock-up clutch is engaged in the region where the accelerator operation amount is equal to or larger than the specified value as described above, the slippage of the torque converter is suppressed, and an increase in an engine speed Ne is thereby suppressed as indicated by a solid line graph in FIG. 6, for example. As a result, the upshift is performed before the engine speed Ne reaches a maximum output speed Ne1, and thus the drivability desired by the driver cannot be realized.

To handle this problem, based on such a premise that the lock-up clutch is engaged in the region where the accelerator operation amount is equal to or larger than the specified value, it is considered to set the upshift line such that the engine speed Ne exceeds the maximum output speed Ne1 even in the completely engaged state of the lock-up clutch, for example. However, in such a case, when the lock-up clutch cannot be engaged during cold time or the like, for example, the engine speed Ne is increased due to the slippage of the torque converter. As a result, as indicated by a solid line graph in FIG. 7 as one example, the engine speed Ne possibly exceeds a red zone speed Ne2 and causes over rotation of the engine.

The present disclosure provides a transmission gear control apparatus that improves drivability by performing an upshift after appropriately increasing an engine speed regardless of an engagement state of a lock-up clutch in the case where the lock-up clutch is engaged in a region where an accelerator operation amount is equal to or larger than a specified value.

A transmission gear control apparatus for a vehicle according to one aspect of the present disclosure is provided. The vehicle includes an engine, an automatic transmission, a torque converter, and an accelerator operation amount sensor. The torque converter is disposed between the engine and the automatic transmission. The torque converter includes a lock-up clutch. The accelerator operation amount sensor is configured to detect an accelerator operation amount by a driver. The transmission gear control apparatus includes an electronic control unit. The electronic control unit is configured to: (i) control switching of a transmission gear stage of the automatic transmission at least on a basis of a change in vehicle speed of the vehicle; (ii) control lockup of the lock-up clutch on a basis of a state of the vehicle; and (iii) control the automatic transmission when the accelerator operation amount is equal to or larger than a specified value such that an upshift of the automatic transmission is performed at a higher vehicle speed as a rotation difference between input and putput of the torque converter is reduced.

Note that the specified value of the accelerator operation amount is an accelerator operation amount from which the driver's intention to exert maximum performance of the engine can be acknowledged, and may be adapted in advance by an experiment or the like. That the accelerator operation amount is equal to or larger than the specified value does not always have to be determined from the accelerator operation amount. For example, that the accelerator operation amount is equal to or larger than the specified value may be determined from engine torque or the like. Alternatively, while that the accelerator operation amount is equal to or larger than the specified value is basically determined from the accelerator operation amount, the engine torque, an engine speed, a turbine rotational speed, the vehicle speed, and the like may be added for the determination.

In addition, that the rotation difference of the torque converter is relatively small or large may mean that the rotation difference is equal to or smaller than a threshold that is set in advance or is larger than said threshold with said threshold being used as a reference, for example. Alternatively, such a threshold may not be provided, and a case of the small rotation difference and a case of the large rotation difference may relatively be compared. This means that the vehicle speed, at which the upshift is performed, is continuously changed in accordance with the rotation difference of the torque converter.

Furthermore, the rotation difference of the torque converter may be computed by detecting the engine speed and the turbine rotational speed by sensors and computing the rotation difference therebetween, for example. However, the rotation difference is not limited thereto. The rotation difference may be estimated from the engine speed, the engine torque, the vehicle speed, or the like.

According to the transmission gear control apparatus according to the above aspect, the lock-up clutch is engaged in a region where the accelerator operation amount is equal to or larger than the specified value. In this way, when the rotation difference of the torque converter is reduced (for example, becomes equal to or smaller than the threshold), timing of the upshift is changed to a high vehicle speed side, and the engine speed is increased due to this change. That is, slippage of the torque converter is restricted in an engaged state of the lock-up clutch. Thus, compared to a disengaged state of the lock-up clutch, the engine speed is reduced at the same vehicle speed in the engaged state of the lock-up clutch, and thus the upshift is performed on the high vehicle speed side to compensate for the reduction.

More specifically, the rotation difference of the torque converter is changed by engagement of the lock-up clutch. In view of this, the timing of the upshift is corrected, so as to appropriately reflect an influence of the change. In this way, the upshift can be performed after the engine speed is appropriately increased regardless of the engagement state of the lock-up clutch. Therefore, drivability is improved.

In the transmission gear control apparatus according to the above aspect, the electronic control unit may be configured to control switching of the transmission gear stage of the automatic transmission with reference to a gear change map on which the transmission gear stage is defined in such a way as to correspond to the vehicle speed and the accelerator operation amount. Upshift lines that respectively correspond to the engaged state and the disengaged state of the lock-up clutch may be set on the gear change map. The upshift line corresponding to the engaged state of the lock-up clutch may be set on the higher vehicle speed side than the upshift line corresponding to the disengaged state of the lock-up clutch.

In this way, the slippage of the torque converter is restricted by the engagement of the lock-up clutch. Thus, when the rotation difference of the torque converter is reduced, that is, when the engine speed is reduced with respect to the vehicle speed, in order to correspond to this reduction, the upshift line that is set on the high vehicle speed side is used. On the other hand, when the rotation difference of the torque converter is increased, that is, when the engine speed is increased with respect to the vehicle speed, in order to correspond to this increase, the upshift line that is set on a low vehicle speed side is used.

In the transmission gear control apparatus according to the above aspect, the electronic control unit may be configured to control switching of the transmission gear stage of the automatic transmission with reference to the gear change map on which the transmission gear stage is defined in such a manner as to correspond to the vehicle speed and the accelerator operation amount. The upshift line corresponding to the disengaged state of the lock-up clutch may be set on the gear change map. The electronic control unit may be configured to correct setting of the upshift line on the gear change map such that the upshift line is corrected to the higher vehicle speed side as the rotation difference is reduced. According to the transmission gear control apparatus according to this aspect, the upshift line is changed in accordance with a degree of the change in the rotation difference of the torque converter, which is caused by the engagement of the lock-up clutch. Thus, the engine speed can further appropriately be increased.

In the transmission gear control apparatus according to the above aspect, the electronic control unit may be configured to constantly compute the rotation difference at specified intervals during a travel of the vehicle. The electronic control unit may be configured to correct the setting of the upshift line on the gear change map on a basis of the computed rotation difference. In addition, in the transmission gear control apparatus according to the above aspect, the electronic control unit may be configured to correct the setting of the upshift line on the gear change map on the basis of the rotation difference when an actuation point that represents the state of the vehicle on the gear change map reaches the upshift line. According to the transmission gear control apparatus according to this aspect, a load of control computation can be reduced.

In the transmission gear control apparatus for the vehicle according to the present disclosure, in the case where the lock-up clutch of the torque converter is engaged in the region where the accelerator operation amount is equal to or larger than the specified value, a relationship between the engine speed and the vehicle speed is changed in accordance with the engagement state of the lock-up clutch. In view of this, when the accelerator operation amount is equal to or larger than the specified value, the timing of the upshift is changed in accordance with the rotation difference of the torque converter. In this way, the upshift can be performed after the engine speed is appropriately increased regardless of the engagement state of the lock-up clutch. Therefore, the drivability is improved.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is a table that represents engagement states of friction engagement elements at each gear stage in an automatic transmission;

FIG. 3 is a block diagram of a configuration of a control system of an ECU and the like;

DETAILED DESCRIPTION OF EMBODIMENTS

A description will hereinafter be made on embodiments of the present disclosure on the basis of the drawings. In this embodiment, a description will be made on a case where the present disclosure is applied to an FF (front-engine, front-wheel-drive) vehicle on which an automatic transmission is mounted. First, a description will be made on an overall configuration of a powertrain of the vehicle.

Figure 1:
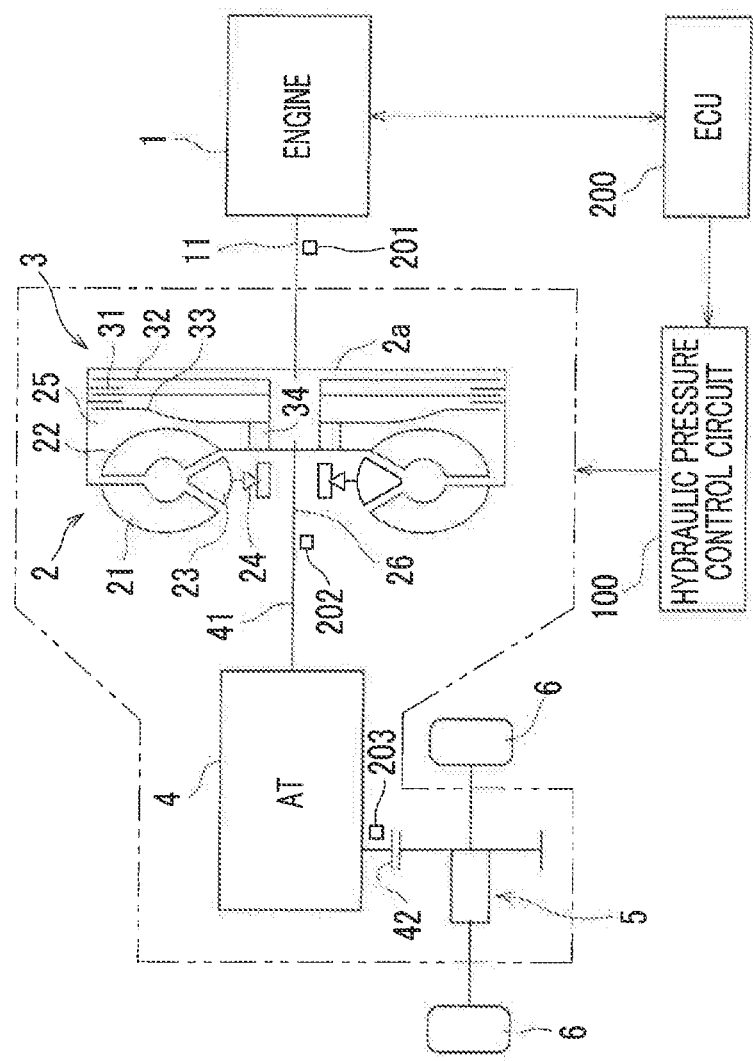
FIG. 1 is a schematic configuration diagram of a powertrain of a vehicle according to one embodiment.

FIG. 1 is a schematic configuration diagram of the powertrain of the vehicle according to this embodiment. This vehicle includes an engine 1, a torque converter 2, a lock-up clutch 3, an automatic transmission (AT) 4, a differential device 5, drive wheels (front wheels) 6, driven wheels (rear wheels: not shown), a hydraulic pressure control circuit 100, an electronic control unit (ECU) 200, and the like. A crankshaft 11 as an output shaft of the engine 1 is coupled to the torque converter 2, and a rotational speed thereof (an engine speed Ne) is detected by an engine speed sensor 201.

Torque Converter—The torque converter 2 includes: a pump impeller 21 on an input side; a turbine runner 22 on an output side; a stator 23 that realizes a torque amplifying function; and a one-way clutch 24, and transmits power between the pump impeller 21 and the turbine runner 22 via hydraulic oil (ATF). At this time, when a rotational speed of the turbine runner 22 (a turbine rotational speed Nt) is lower than a rotational speed of the pump impeller 21 (the same as the engine speed Ne), torque is amplified in accordance with differential rotation therebetween (an rotation difference between input and output of the torque converter 2: Ne−Nt).

While the above pump impeller 21 is coupled to the crankshaft 11 of the engine 1, a turbine shaft 26 is coupled to the turbine runner 22 and outputs rotation to the automatic transmission 4. A rotational speed of this turbine shaft 26 (the turbine rotational speed Nt) is detected by a turbine rotational speed sensor 202. Note that a converter oil chamber 25 that circulates the hydraulic oil is provided in the torque converter 2, and the hydraulic oil is supplied and discharged via a port, which is not shown.

Lock-up Clutch—The lock-up clutch 3 directly couples an input side and an output side of the above torque converter 2 and is a multi-plate clutch that includes: plural clutch plates 31, 32; and a lock-up piston 33 that can press the clutch plates 31, 32. The clutch plate 31 is slidably supported in an axial direction by a clutch hub that is fixed to a front cover 2a of the torque converter 2. Meanwhile, the clutch plate 32 is slidably supported in the axial direction by a clutch hub that is connected to the turbine runner 22.

The lock-up piston 33 is movably provided in the axial direction in the torque converter 2, and a lock-up oil chamber 34 is provided on a back surface side thereof (an opposite side from the front cover 2a and a left side in FIG. 1). When the hydraulic oil is supplied to this lock-up oil chamber 34, the clutch plate 31 and the clutch plate 32 are engaged, so as to bring the lock-up clutch 3 into a completely engaged state or into a state under slip control.

Meanwhile, when a hydraulic pressure of the above lock-up oil chamber 34 is reduced, the lock-up piston 33 is actuated to a disengagement side (the left side in FIG. 1) by a return spring (not shown), and thereby brings the lock-up clutch 3 into a disengaged state. Just as described, an engagement state of the lock-up clutch 3 is switched by hydraulic pressure control of the lock-up oil chamber 34. The hydraulic pressure control of the lock-up oil chamber 34 is executed by the known hydraulic pressure control circuit 100.

Automatic Transmission—The automatic transmission 4 is configured by including a known transmission gear mechanism and includes plural hydraulic friction engagement elements, a planetary gear device, and the like. As shown in FIG. 1, while an input shaft 41 of the automatic transmission 4 is coupled to the turbine shaft 26 of the torque converter 2, an output gear 42 thereof is coupled to the drive wheels 6 via the differential device 5. A rotational speed of the output gear 42 (an output rotational speed No) is detected by an output rotational speed sensor 203.

As shown in FIG. 2 as one example, the automatic transmission 4 of this embodiment includes four clutches C1 to C4 and two brakes B1, B2 as the friction engagement elements. When these components are selectively engaged, any of eight forward gear stages (a first gear stage "1st" to an eighth gear stage "8th") and a reverse gear stage (a reverse gear stage "Rev") is established. Note that FIG. 2 is an engagement table that represents a condition for establishing each of the gear stages. A circle represents "engagement", and no mark represents "disengagement".

Control that engages or disengages those clutches C1 to C4 and brakes B1, B2 is also executed by the hydraulic pressure control circuit 100. Each of those clutches C1 to C4 and brakes B1, B2 is a multi-plate friction engagement element that has plural plates and a piston like the lock-up clutch 3. When those clutches C1 to C4 and brakes B1, B2 are individually engaged or disengaged through hydraulic pressure control by the hydraulic pressure control circuit 100, the plural gear stages are established as in FIG. 2.

ECU—The ECU 200 includes a CPU, a ROM, a RAM, a backup RAM, a timer, and the like. The ROM stores various control programs, a map that is referred during execution of the control programs, and the like. The CPU executes computation processing on the basis of the various control programs and the map stored in the ROM. The RAM is a memory that temporarily stores a computation result of the CPU, data input from each of the sensors, and the like. The backup RAM is a non-volatile memory that stores data and the like to be saved during a stop of the engine 1 and the like.

Figure 3:
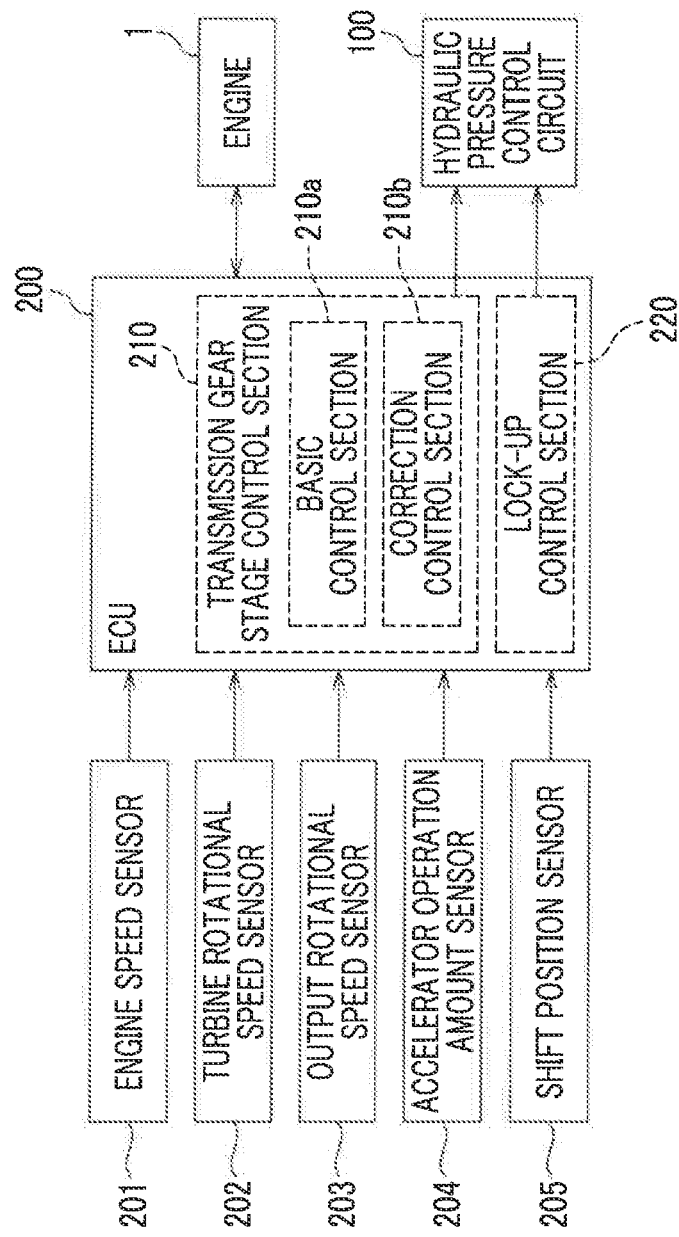

As schematically shown in FIG. 3, in addition to the engine speed sensor 201, the turbine rotational speed sensor 202, and the output rotational speed sensor 203 described above, sensors that include: an accelerator operation amount sensor 204 that detects an operation amount of an accelerator pedal, which is not shown (an accelerator operation amount); a shift position sensor 205 that detects a position of a shift lever, which is not shown; and the like are connected to the ECU 200. The ECU 200 receives signals from these various sensors (including switches).

Based on the signals from the various sensors, the ECU 200 controls a throttle opening degree, a fuel injection amount, ignition timing, and the like of the engine 1. In this way, the ECU 200 controls an operation state of the engine 1. In addition, as will be described below, the ECU 200 outputs a control signal to the hydraulic pressure control circuit 100 of the automatic transmission 4 and causes operations of solenoid valves and the like. In this way, the friction engagement elements of the automatic transmission 4 are engaged or disengaged as described above, and an appropriate gear stage is thereby established.

The ECU 200 outputs the control signal to the hydraulic pressure control circuit 100 and causes the operations of the solenoid valves and the like, just as described. In this way, as will be described below, the ECU 200 switches the engagement state of the lock-up clutch 3 to any one of the completely engaged state, a semi-engaged state (engaged under the slip control), or the disengaged state. Note that, while the single ECU 200 is shown in FIG. 1, the ECU 200 may be configured by including plural ECUs for purposes of engine control, transmission control, and the like when necessary.

Gear Stage Control of Automatic Transmission—In the control of switching the gear stage of the automatic transmission 4, for example, when the shift lever is operated in a drive range and the automatic transmission 4 is brought into an automatic gear change mode (an automatic mode), the ECU 200 selects a favorable gear stage with reference to a gear change map on the basis of a vehicle state as will be described below. This gear change map is a known map that takes an aspect of a gear change chart having a vehicle speed V and an accelerator operation amount Acc (or may be the throttle opening degree) as parameters, and is stored in the ROM of the ECU 200.

Figure 4:
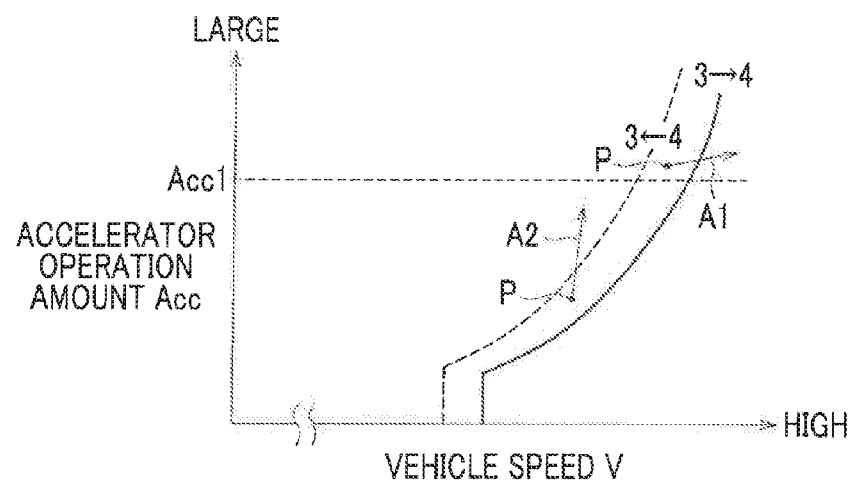
FIG. 4 is an image chart that schematically illustrates switching between a third gear stage and a fourth gear stage on a gear change chart (a gear change map)

That is, as shown in FIG. 4 as one example, the gear change map has a two-dimensional coordinate that has a horizontal axis representing the vehicle speed V and a vertical axis representing the accelerator operation amount Acc. The two-dimensional coordinate is sectioned into plural regions, in each of which the favorable gear stage is defined, and a boundary between two of those regions is a gear change line (a gear stage switching line). For convenience of the description, an upshift and a downshift between the third gear stage and the fourth gear stage are only shown in FIG. 4. However, the same applies to the other gear stages.

As indicated by a solid line in FIG. 4, a 3→4 upshift line that is used for the upshift in accordance with a change in the vehicle state (the vehicle speed V and the accelerator operation amount Acc) is set on the gear change map. As indicated by a broken line, a 4→3 downshift line is also set for the downshift. A region between the 3→4 upshift line and the 4→3 downshift line is a hysteresis region that is provided for a hysteresis between the upshift and the downshift.

The ECU 200 computes the vehicle speed V on the basis of the signal from the output rotational speed sensor 203 (the output rotational speed No) and determines a target gear stage with reference to the gear change map on the basis of this vehicle speed V and the signal from the accelerator operation amount sensor 204 (the accelerator operation amount Acc). The ECU 200 also determines a current gear stage on the basis of the output rotational speed No and the signal from the turbine rotational speed sensor 202 (the turbine rotational speed Nt).

When these current gear stage and target gear stage differ from each other, the ECU 200 switches the gear stage. For example, in the cases where the current gear stage is the third gear stage, the vehicle speed V is increased, and an actuation point P that represents the vehicle state crosses the 3→4 upshift line as schematically indicated by an arrow A1 in FIG. 4, the target gear stage that is computed from the gear change map is fourth gear. Thus, the ECU 200 outputs a control signal that is used to set the fourth gear stage to the hydraulic pressure control circuit 100 of the automatic transmission 4 and thereby performs the upshift from third gear to the fourth gear.

Meanwhile, for example, in the cases where the current gear stage is the fourth gear stage, the driver depresses the accelerator pedal, and the actuation point P crosses the 4→3 downshift line as indicated by an arrow A2 in FIG. 4, the target gear stage that is computed from the gear change map is the third gear. Thus, the ECU 200 outputs a control signal that is used to set the third gear stage to the hydraulic pressure control circuit 100 and thereby performs the downshift from the fourth gear to the third gear.

A known control program that is used to switch the gear stage, just as described, is stored in the ROM of the ECU 200. The ECU 200 includes a transmission gear stage control section 210 (see FIG. 3) that executes this control program (a gear stage control routine) to switch the gear stage of the automatic transmission 4 on the basis of the changes in the vehicle speed V and the accelerator operation amount Acc. This transmission gear stage control section 210 has a basic control section 210*a* (see FIG. 3) that switches the gear stage of the automatic transmission 4 with reference to a gear change map like the one in FIG. 4.

Lock-Up Clutch Control—Next, a description will be made on lock-up control. First, the ROM of the ECU 200 stores a known lock-up control map that defines the favorable engagement state of the lock-up clutch 3 on a two-dimensional coordinate having the vehicle speed V and the accelerator operation amount Acc like the gear change map. For convenience of the description, FIG. 5 only shows a torque converter region and a flex lock-up region at the fourth gear stage. However, the lock-up control map is set for each gear stage of the forward eight gears.

Figure 5:
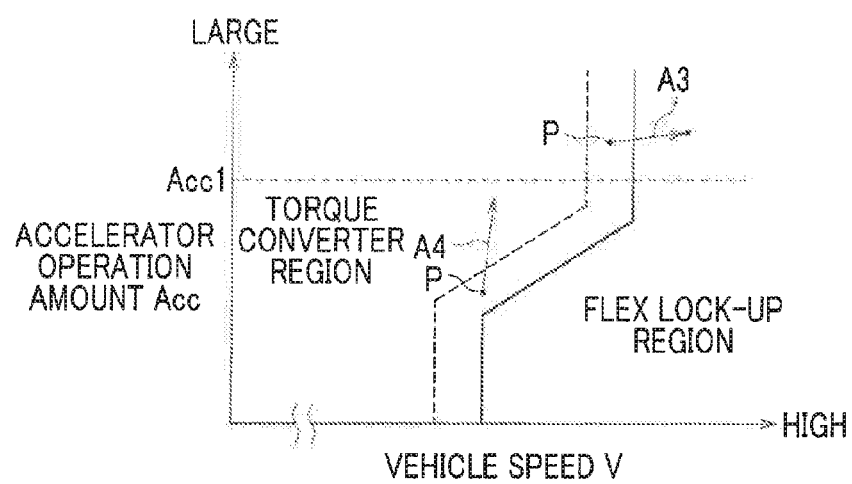
FIG. 5 is an image chart that schematically illustrates lock-up control at the fourth gear stage on a lock-up chart (a lock-up control map)

As shown in FIG. 5, the torque converter region at the fourth gear stage where the lock-up clutch 3 is controlled for disengagement is sectioned from a low vehicle speed side to a large accelerator operation amount side. Meanwhile, the flex lock-up region where the lock-up clutch 3 is controlled in the semi-engaged state (the slip control) is sectioned from a high vehicle speed side to a small accelerator operation amount side. Note that, although not shown in FIG. 5, a lock-up region where the lock-up clutch 3 is completely engaged is also sectioned.

More specifically, conventionally, the lock-up clutch 3 is not engaged (that is, the torque converter region is set) on the large accelerator operation amount side in general, so as to suppress generation of noise and a vibration. However, in this embodiment, the lock-up clutch 3 is also engaged on the large accelerator operation amount side for a purpose of improving drivability of the vehicle. In the example of FIG. 5, the low vehicle speed side of the flex lock-up region is reduced toward the small accelerator operation amount side, so as to reduce booming noise and the like that are generated in conjunction with engagement of the lock-up clutch 3.

A boundary between those regions is a lock-up line (a switching line of the engagement state of the lock-up clutch 3). A flex lock-up on line, on which the lock-up clutch 3 is engaged in accordance with the changes in the vehicle speed V and the accelerator operation amount Acc, is indicated by a solid line in FIG. 5. A flex lock-up off line, on which the lock-up clutch 3 is disengaged, is indicated by a broken line. Note that a region between these two lock-up lines is a hysteresis region that is provided for a hysteresis between the slip control and disengagement control of the lock-up clutch 3.

The ECU 200 controls the lock-up clutch 3 by using the hydraulic pressure control circuit 100 such that the lock-up clutch 3 is brought into the engagement state that corresponds to the region where the current vehicle speed V and the current accelerator operation amount Acc, that is, the actuation point P representing the vehicle state is included in the lock-up control map. For example, in the cases where the vehicle speed V is increased in the torque converter region and, as schematically indicated by an arrow A3 in FIG. 5, the actuation point P crosses the flex lock-up on line and enters the flex lock-up region, the ECU 200 outputs a control signal that is used to execute the slip control of the lock-up clutch 3 to the hydraulic pressure control circuit 100 of the automatic transmission 4.

Meanwhile, as indicated by an arrow A4 in FIG. 5, in the case where the actuation point P crosses the flex lock-up off line and enters the torque converter region, the lock-up clutch 3 is disengaged. A known control program that is used to control the engagement state of the lock-up clutch 3, just as described, is stored in the ROM of the ECU 200. The ECU 200 includes a lock-up control section 220 (see FIG. 3) that executes this control program (a lock-up control routine) to control the engagement state of the lock-up clutch 3 on the basis of the vehicle state.

Correction Control of Gear Change Line—As described above with reference to FIG. 4, when the actuation point P crosses the upshift line on the gear change map, the ECU 200 performs the upshift. The upshift line is inclined such that a large accelerator operation amount side thereof (an upper side in FIG. 4) is located on a high vehicle speed side (a right side in FIG. 4). This is because it is considered that the driver attempts to sufficiently exert performance of the engine 1 when the accelerator operation amount is large. At this time, the upshift is desirably performed after the engine speed Ne is sufficiently increased.

For the above reason, on the large accelerator operation amount side, that is, in the torque converter region, the upshift line is conventionally set in consideration of slippage of the torque converter 2 in general. Accordingly, the change in the engine speed Ne during the upshift is as indicated by a broken line graph in a timing chart of FIG. 6 as one example. That is, in the disengaged state of the lock-up clutch 3, the engine speed Ne exceeds a maximum output speed Ne1 before a start of the upshift (time t1), and is increased to a speed immediately below a red zone speed Ne2.

However, as described above, the flex lock-up region and the like are also set on the large accelerator operation amount side in this embodiment. Here, the lock-up clutch 3 is engaged, and the slippage of the torque converter 2 is suppressed. Thus, the engine speed Ne is less likely to be increased. That is, as indicated by a solid line graph in FIG. 6, the upshift is performed before the engine speed Ne reaches the maximum output speed Ne1, and thus the drivability desired by the driver cannot be realized.

Figure 6:
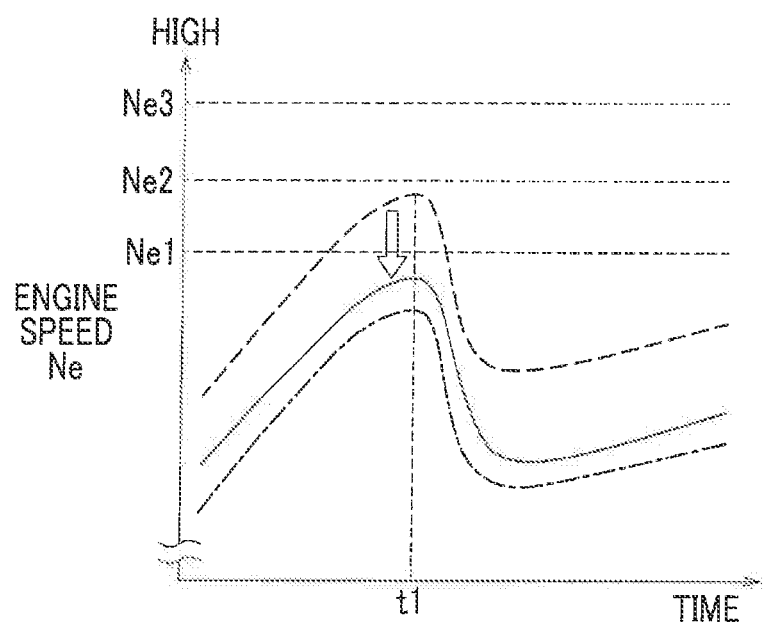
FIG. 6 is a timing chart that illustrates a situation where an upshift is performed in a state where an engine speed is not sufficiently increased in the case where a torque converter region is provided as a premise.

Note that a change in the turbine rotational speed Nt is indicated by a one-dot chain line graph in FIG. 6 and is the same as the engine speed Ne at a time when the lock-up clutch 3 is completely engaged. It is understood from this graph that, when the lock-up clutch 3 is brought into the completely engaged state, the engine speed Ne before the upshift is further reduced, which leads to the degraded drivability.

Figure 7:
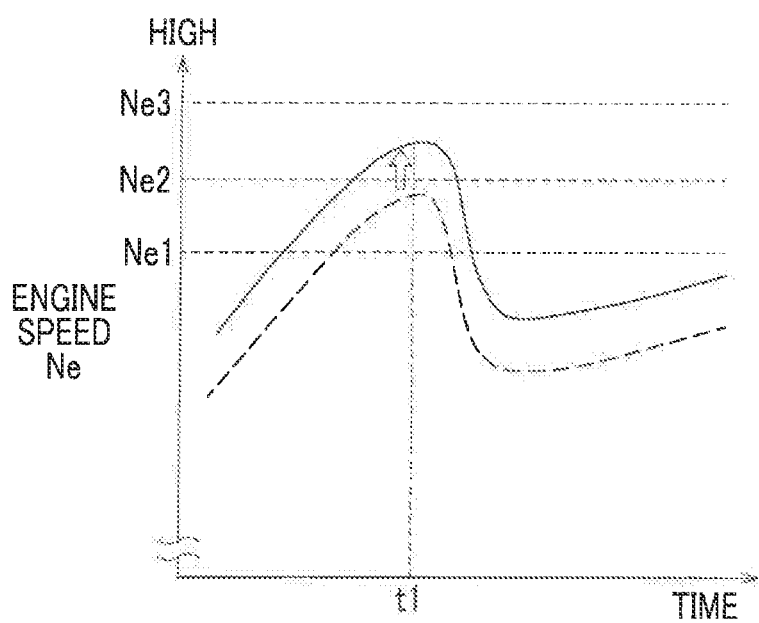
FIG. 7 is a chart that corresponds to FIG. 6 and illustrates a situation where the engine speed is excessively increased in the case where a lock-up region is provided as a premise.

On the contrary to the above, it is considered to set the upshift line to the higher vehicle speed side on the basis of such a premise that the lock-up clutch 3 is also engaged on the large accelerator operation amount side. In this way, as indicated by a broken line graph in FIG. 7 as one example, the upshift is started after the engine speed Ne is increased to the speed immediately below the red zone speed Ne2 (the time t1). Note that, similarly, the turbine rotational speed Nt (not shown) is also increased to a rotational speed immediately below the red zone speed Ne2.

By the way, there is a case where the lock-up clutch 3 cannot be engaged as desired due to a low temperature of the ATF, such as after a cold start in a cold region. At this time, the engine speed Ne is increased due to the slippage of the torque converter 2. That is, as indicated by a solid line graph in FIG. 7, the engine speed Ne is increased and exceeds the red zone speed Ne2 (is increased to a speed near a fuel cut speed Ne3 in the example of the drawing) and causes so-called over rotation of the engine 1.

A relationship between the engine speed Ne and the vehicle speed V is changed when the slippage of the torque converter 2 is restricted by the engagement of the lock-up clutch 3 as described above. In view of this, in this embodiment, the upshift line, that is, timing of the upshift is corrected in accordance with the engagement state of the lock-up clutch 3, so as to appropriately reflect an influence of the change. In this way, the upshift is performed after the engine speed Ne is appropriately increased regardless of the engagement state of the lock-up clutch 3.

Figure 8:
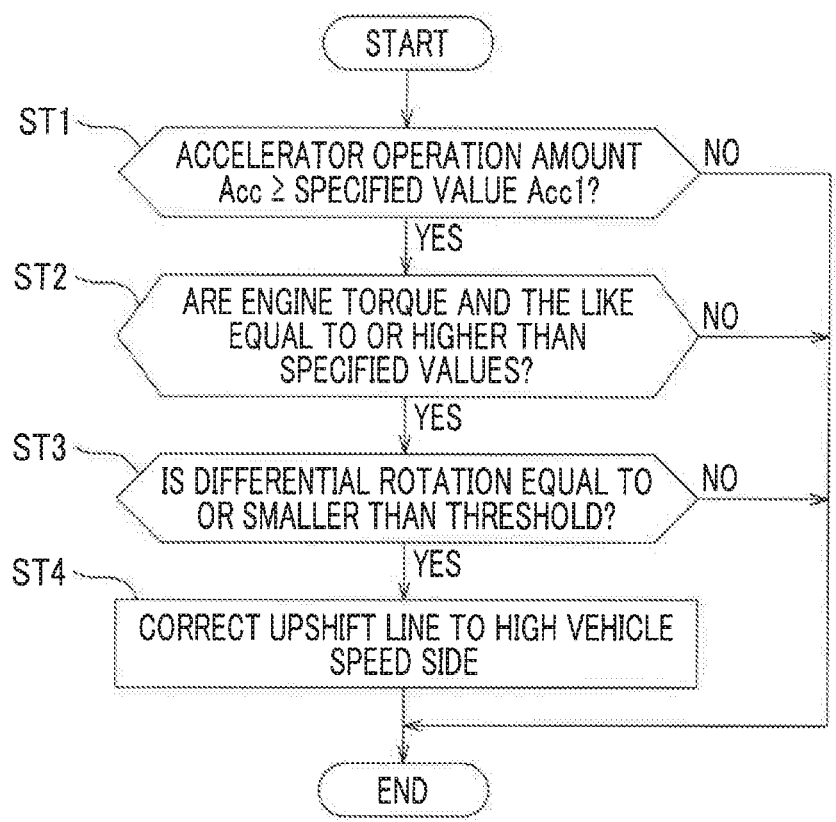
FIG. 8 is a flowchart of a correction routine of an upshift line.

A specific description will hereinafter be made on a correction routine of the upshift line with reference to a flowchart in FIG. 8. A case of the upshift of the third gear→the fourth gear will hereinafter be described as one example. However, the same applies to cases of other upshifts, such as the upshift of second gear→the third gear and the upshift of the fourth gear→fifth gear. Note that the routine shown in FIG. 8 is basically and constantly executed at specified timing (for example, at specified time intervals) during a travel of the vehicle.

First, in first step ST1 after START, it is determined whether the accelerator operation amount Acc is equal to or larger than a specified value Acc1 (Acc≥Acc1). This specified value Acc1 is an accelerator operation amount from which the driver's intention to exert the maximum performance of the engine 1 can be acknowledged, and is adapted in advance by an experiment or the like. If the accelerator operation amount Acc is smaller than the specified value Acc1 and thus a negative determination is made (NO), the routine is terminated without unnecessarily correcting the upshift line (END).

On the other hand, if the accelerator operation amount Acc is equal to or larger than the specified value Acc1 and thus a positive determination is made (YES), the process proceeds to step ST2, and it is determined whether each parameter other than the accelerator operation amount Acc, such as the engine speed Ne, the turbine rotational speed Nt, the vehicle speed V, and engine torque, is equal to or higher than a specified value. Note that, similar to the case of the accelerator operation amount Acc, this specified value is a value from which the driver's intention can be acknowledged.

For example, the engine torque is computed on the basis of the accelerator operation amount Acc, an intake air flow rate, the engine speed Ne, and the like. If this computed value is lower than the specified value and thus a negative determination is made (NO), the routine is terminated without correcting the upshift line (END). On the other hand, if the engine torque is equal to or higher than the specified value and thus a positive determination is made (YES), the process proceeds to step ST3. Here, differential rotation (Ne–Nt) between the engine speed Ne and the turbine rotational speed Nt is computed. Then, it is determined whether this computed differential rotation is equal to or smaller than a threshold that is set in advance.

That is, in this embodiment, the upshift line is set on the gear change map basically on the basis of such premises that the lock-up clutch 3 is in the disengaged state and the differential rotation between the engine speed Ne and the turbine rotational speed Nt is significantly increased. Accordingly, in the cases where the lock-up clutch 3 is brought into the semi-engaged state, for example, and the slippage of the torque converter 2 is thus restricted (that is, if the differential rotation becomes equal to or smaller than the threshold), it is considered that the engine speed Ne is not sufficiently increased even when the engine speed Ne reaches the upshift line set on the gear change map.

In view of the above, if the differential rotation computed in step ST3 is larger than the threshold and thus a negative determination is made (NO), the lock-up clutch 3 is in the disengaged state, or, even when the lock-up clutch 3 is engaged, the influence thereof is small. Thus, the routine is terminated without correcting the upshift line (END). On the other hand, if the computed differential rotation is equal to or smaller than the threshold and thus a positive determination is made (YES), the process proceeds to step ST4. Then, the upshift line is corrected to the high vehicle speed side, and the routine is terminated (END).

In step ST4, a correction value of the upshift line that corresponds to the differential rotation is computed from a correction map. In this correction map, the correction value is set to become a smaller value as the differential rotation is increased from the disengagement of the lock-up clutch 3 (where the differential rotation is the maximum) to the complete engagement thereof (where the differential rotation is zero). That is, the correction value is used to change the upshift line (the vehicle speed V) such that the upshift is performed at the substantially same engine speed Ne even when the differential rotation differs, and is set in advance by an experiment or the like.

Figure 9:
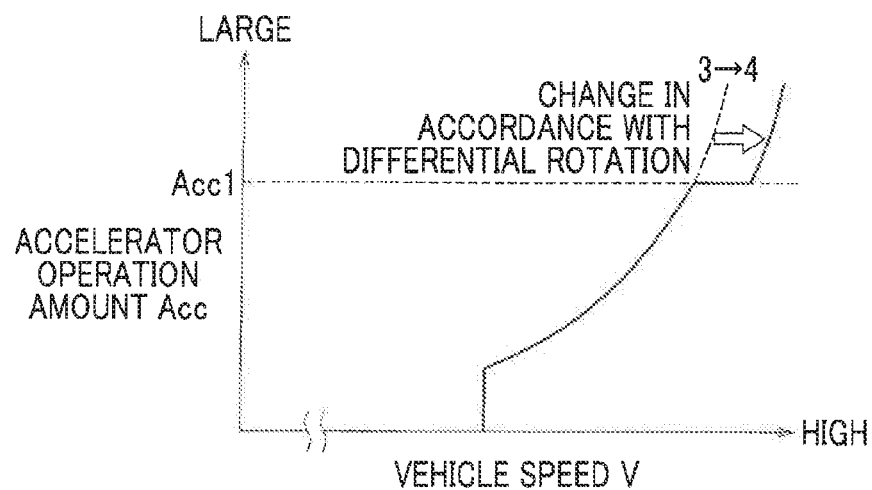
FIG. 9 is an image chart that illustrates correction of the upshift line in accordance with differential rotation between the engine speed and a turbine rotational speed.

In this way, as schematically shown in FIG. 9, as the differential rotation is reduced, the upshift line is corrected to the higher vehicle speed side by the correction value. Then, in accordance with the engagement state of the lock-up clutch 3, that is, regardless of whether the lock-up clutch 3 is in the disengaged state, the semi-engaged state, or the completely engaged state, the upshift is performed in the similar manner after the engine speed Ne exceeds the maximum output speed Ne1 and is increased to the speed immediately below the red zone speed Ne2.

By executing each step in the flowchart of FIG. 8, the transmission gear stage control section 210 of the ECU 200 has a correction control section 210b (see FIG. 3) that corrects the upshift line to the higher vehicle speed side as the differential rotation between the engine speed Ne and the turbine rotational speed Nt (the rotation difference of the torque converter 2) is reduced. In other words, in this embodiment, the transmission gear stage control section 210 of the ECU 200 is configured to perform the upshift on the high vehicle speed side in the cases where the accelerator operation amount Acc is equal to or larger than the specified value Acc1 and the differential rotation is relatively low, in comparison with the case where the differential rotation is relatively high.

As it has been described so far, according to the transmission gear control apparatus for the vehicle according to this embodiment, first, the favorable upshift line is set on the gear change map on the basis of such a premise that the large accelerator operation amount side is basically set as the torque converter region. Accordingly, when the lock-up clutch 3 is disengaged, as indicated by a broken line graph in a timing chart of FIG. 10, the engine speed Ne exceeds the maximum output speed Ne1 and is increased to the speed immediately below the red zone speed Ne2 before the start of the upshift (the time t1).

However, the flex lock-up region and the like are also set on the large accelerator operation amount side in this embodiment. In the flex lock-up region and the like, the lock-up clutch 3 is engaged (including the semi-engagement), and the slippage of the torque converter 2 is suppressed. Thus, there is a case where the differential rotation between the engine speed Ne and the turbine rotational speed Nt is not significantly increased. For this reason, when the gear stage is switched in accordance with the gear change map, as indicated by a two-dot chain line graph in FIG. 10, the engine speed Ne may not sufficiently be increased.

Figure 10:
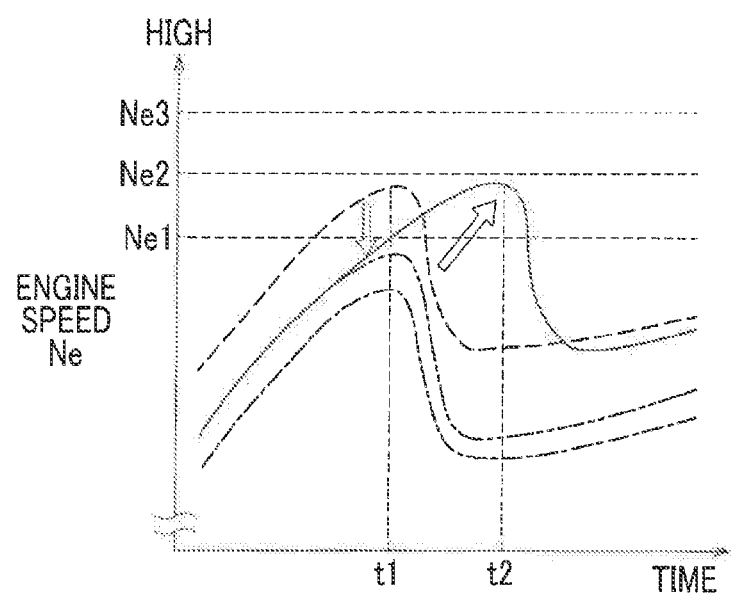
FIG. 10 is a chart that corresponds to FIG. 6 and illustrates a case where the correction routine of this embodiment is executed.

On the other hand, by correcting the upshift line to the high vehicle speed side in accordance with the differential rotation as described above, the timing of the upshift is delayed as indicated by a solid line graph in FIG. 10, and the upshift is started after the engine speed Ne exceeds the maximum output speed Ne1 (time t2). That is, even when the relationship between the engine speed Ne and the vehicle speed V is changed due to the engagement of the lock-up clutch 3, the timing of the upshift is corrected to appropriately reflect this change. Thus, the upshift is performed after the engine speed Ne is sufficiently increased. Therefore, the drivability is improved.

Another Embodiment

The embodiment that has been described so far is merely illustrative and thus has no intention of limiting the configuration, application, and the like of the present disclosure. For example, the correction routine (the flowchart in FIG. 8) in the embodiment is constantly executed during the travel of the vehicle. However, the present disclosure is not limited thereto. For example, the correction routine may be started when the actuation point P reaches the upshift line on the gear change map.

Figure 11:
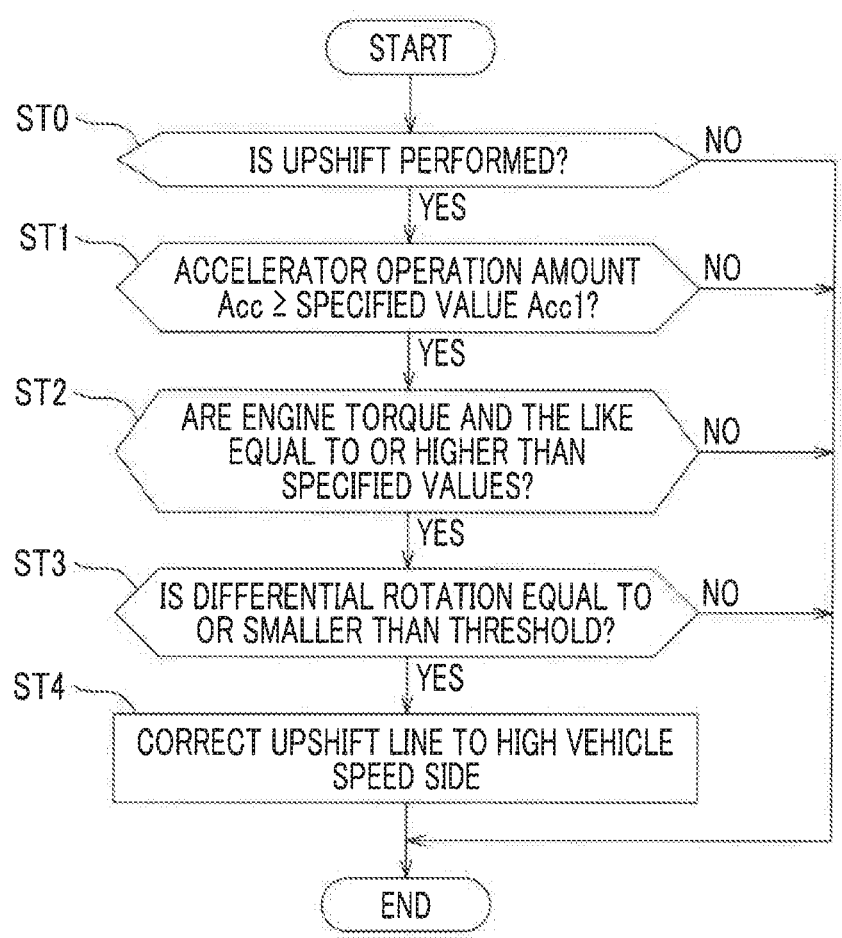
FIG. 11 is a flowchart that corresponds to FIG. 8 and illustrates a correction routine of another embodiment.

That is, as shown in FIG. 11 as one example, new step ST0 is provided before step ST1 in the flowchart of FIG. 8, and it is determined here whether the actuation point P that represents the vehicle state (the vehicle speed V and the accelerator operation amount Acc) reaches the upshift line (is the upshift performed?). If a negative determination is made (NO), the routine is terminated without correcting the upshift line (END). On the other hand, if a positive determination is made (YES), the process proceeds to step ST1. When the correction routine is started at timing at which the vehicle state is changed and the upshift is performed, just as described, a computation load of the CPU in the ECU 200 can be reduced in comparison with a case where the correction routine is constantly executed during driving of the vehicle as in the embodiment.

In addition, in the embodiment, it is determined in step ST1 in the flowchart of FIG. 8 whether the accelerator operation amount Acc is equal to or larger than the specified value Acc1. However, the present disclosure is not limited thereto. That the accelerator operation amount is large may be determined from the parameter other than the accelerator operation amount Acc (for example, the engine speed Ne, the turbine rotational speed Nt, the vehicle speed V, the engine torque, or the like).

On the other hand, the determination on the engine torque and the like in step ST2 in the flowchart of FIG. 8 may not be made. However, when the determination on the parameters other than the accelerator operation amount Acc is made as in the embodiment, robustness of the control with respect to malfunction of the sensor and the like is enhanced. Thus, such a determination is preferred.

Furthermore, in the above embodiment, based on such a premise that the lock-up clutch 3 is basically disengaged on the large accelerator operation amount side, the upshift line is set on the gear change map, and this upshift line is corrected in accordance with the differential rotation between the engine speed Ne and the turbine rotational speed Nt. However, the present disclosure is not limited thereto. For example, the upshift line may be set on the basis of such a premise that the lock-up clutch 3 is in the semi-engaged state, and the upshift line may be corrected in accordance with the differential rotation. Alternatively, the upshift line may be set on the basis of such a premise that the lock-up clutch 3 is in the completely engaged state, and the upshift line may be corrected in accordance with the differential rotation.

Alternatively, the upshift lines that respectively correspond to the disengaged state and the completely engaged state of the lock-up clutch 3 may be set on the gear change map. Then, either one of the upshift lines may be selected in accordance with the engagement state of the lock-up clutch 3. That is, the upshift line that corresponds to the completely engaged state may be set on the higher vehicle speed side than the upshift line that corresponds to the disengaged state. Then, if the differential rotation between the engine speed Ne and the turbine rotational speed Nt is larger than the threshold that is set in advance, the upshift line that corresponds to the disengaged state may be selected. If the differential rotation is equal to or smaller than the threshold, the upshift line that corresponds to the completely engaged state may be selected.

Moreover, in the embodiment, the case where the present disclosure is applied to the automatic transmission 4 with the forward eight gears, which is mounted on the FF vehicle, is described as the one example. However, the present disclosure is not limited thereto. For example, the present disclosure can also be applied to an automatic transmission with forward seven or fewer gears or forward nine or more gears or a continuously variable transmission. Note that, in the case where the present disclosure is applied to the continuously variable transmission, the present disclosure is applied to a sequential mode in which a transmission gear ratio is switched stepwise by control. In addition, the lock-up clutch is not limited to the multi-plate clutch as in the embodiment. The vehicle may be an FR (front-engine, rear-wheel-drive) vehicle or a four-wheel-drive vehicle.

The present disclosure provides a transmission gear control apparatus that engages the lock-up clutch also on the large accelerator operation amount side, and the upshift is performed after the engine speed is appropriately increased regardless of the engagement state of the lock-up clutch. In this way, the drivability is improved. Thus, the present disclosure is effective for application to a passenger car and the like.

What is claimed is:

1. A transmission gear control apparatus for a vehicle, the vehicle including an engine, an automatic transmission, a torque converter, and an accelerator operation amount sensor, the torque converter being disposed between the engine and the automatic transmission, the torque converter including a lock-up clutch, and the accelerator operation amount sensor being configured to detect an accelerator operation amount by a driver, the transmission gear control apparatus comprising:
   an electronic control unit configured to:
   (i) control switching of a transmission gear stage of the automatic transmission at least on a basis of a change in vehicle speed of the vehicle,
   (ii) control lockup of the lock-up clutch on a basis of a state of the vehicle, and
   (iii) when the accelerator operation amount is equal to or larger than a first specified value, and a rotation difference between input and output of the torque converter is equal to or smaller than a second specified value, control the automatic transmission such that an upshift is performed at a higher vehicle speed than in a case where the rotation difference between input and output of the torque converter is larger than the second specified value.

2. The transmission gear control apparatus according to claim 1, wherein
   the electronic control unit is configured to control switching of the transmission gear stage of the automatic transmission with reference to a gear change map on which the transmission gear stage is defined in such a way as to correspond to the vehicle speed and the accelerator operation amount,
   upshift lines respectively corresponding to an engaged state and a disengaged state of the lock-up clutch are set on the gear change map, and
   the upshift line corresponding to the engaged state of the lock-up clutch is set on a higher vehicle speed side than the upshift line corresponding to the disengaged state of the lock-up clutch.

3. The transmission gear control apparatus according to claim 1, wherein
   the electronic control unit is configured to control switching of the transmission gear stage of the automatic transmission with reference to a gear change map on which the transmission gear stage is defined in such a way as to correspond to the vehicle speed and the accelerator operation amount,
   an upshift line corresponding to an disengaged state of the lock-up clutch is set on the gear change map, and the electronic control unit is configured to correct setting of the upshift line on the gear change map such that the upshift line is corrected to the high vehicle speed side as the rotation difference is reduced.

4. The transmission gear control apparatus according to claim 3, wherein
the electronic control unit is configured to correct setting of the upshift line on the gear change map on a basis of the rotation difference when an actuation point that represents the state of the vehicle on the gear change map reaches the upshift line.

5. The transmission gear control apparatus according to claim 3, wherein
the electronic control unit is configured to constantly compute the rotation difference at specified intervals during a travel of the vehicle, and
the electronic control unit is configured to correct setting of the upshift line on the gear change map on a basis of the rotation difference.

\* \* \* \* \*